United States Patent
Hurlburt

[15] 3,700,257
[45] Oct. 24, 1972

[54] TILTABLE STEERING SYSTEM
[72] Inventor: Joseph C. Hurlburt, Leola, Pa.
[73] Assignee: Sperry Rand Corporation, New Holland, Pa.
[22] Filed: March 30, 1971
[21] Appl. No.: 129,433

[52] U.S. Cl..................280/87 A, 280/96, 74/493
[51] Int. Cl. .............................................B62d 1/18
[58] Field of Search........74/492, 493, 496, 497, 498; 280/87 A, 96

[56] References Cited

UNITED STATES PATENTS

| | | | |
|---|---|---|---|
| 2,123,335 | 7/1938 | Herreshoff | 280/95 R |
| 886,938 | 5/1908 | Brush | 74/498 |
| 3,424,473 | 1/1969 | Morgan | 74/493 |

FOREIGN PATENTS OR APPLICATIONS

| | | | |
|---|---|---|---|
| 930,764 | 7/1963 | Great Britain | 74/493 |

Primary Examiner—Kenneth H. Betts
Attorney—John C. Thompson, Joseph A. Brown and James J. Kennedy

[57] ABSTRACT

A steering system for a vehicle including a tiltable steering shaft connected to a driven lever arm by a universal coupling, the driven lever arm being operatively connected to the vehicle's front wheels for transmitting motion thereto. The steering shaft is rotatively journalled within a steering yoke which is pivotally secured about an axis extending transversely of the vehicle and moveable back and forth thereabouts relative to an operator's station spaced rearwardly therefrom. Housed generally within the steering yoke and operatively associated with the steering shaft is an orbital gear reduction arrangement which effectuates a reduction in the steering system before the output steering motion is transmitted through the universal coupling, thereby tending to minimize load pulsations and variations in steering response when the steering shaft and lever arm are disposed in substantial non-aligned orientations.

7 Claims, 5 Drawing Figures

INVENTOR.
JOSEPH C. HURLBURT

INVENTOR.
JOSEPH C. HURLBURT

TILTABLE STEERING SYSTEM

BACKGROUND OF THE INVENTION

This invention relates to steering systems and more particularly to steering systems of the type utilizing a universal coupling for tilting the steering shaft.

In the past vehicles have employed tiltable steering systems having universal couplings connecting the main steering shaft with a driven lever arm. Problems of acceleration and deacceleration commonly associated with universal drives in general have been incurred in such steering systems, especially where the steering shaft and driven lever arm are disposed in substantial non-aligned orientations during operation.

One of the most significant problems in steering systems using universal couplings is the fluctuations in the mechanical advantage of the system as the steering shaft is rotated. Generally these fluctuations are sinusoidal functions and, as the steering shaft is rotated through a substantial steering range, successive phases of variations in mechanical advantage are incurred. Such phases of variations in mechanical advantage significantly effect the response of the steering system and generally detract from the overall efficiency of the operator. These multiple phases of variations in the mechanical advantage of the steering system is mainly contributable to the fact that many of the universal type tiltable steering systems of the prior art provide for steering reduction after motion has been transmitted through the universal coupling. This often results in the universal coupling rotating two or even three revolutions during one single steering maneuver.

Applicant's tiltable steering system includes a steering shaft connected to a lever arm by a universal coupling but further provides for steering reduction in the steering shaft itself, thereby minimizing the motion transmitted through the universal coupling. By providing the gear reduction within the steering shaft, the universal coupling is only required to rotate through an approximate phase angle of 90°, avoiding the multiple phases of variations in mechanical advantage discussed above. Moreover the universal coupling, lever arm and steering linkage associated therewith are particularly orientated to counter the variations of mechanical advantage that are incurred in the limited rotation of the universal coupling.

It is therefore the principal object of the present invention to minimize the problems of universal coupling or joint type steering systems where the steering shaft and driven lever arm are disposed in non-aligned orientations.

A more particular object of the present invention is to provide a tiltable steering system in which the steering shaft is journalled within a steering yoke which is pivotable about a transverse axis and in which case the steering shaft is connected to a lever arm by a universal coupling and wherein the steering yoke and steering shaft include a gear reduction assembly for effectuating steering reduction prior to the transmission of motion through the universal coupling, thereby reducing the rotation of the coupling such that the successive phases of variations in mechanical advantage are avoided.

Another object of the present invention is to provide a gear reduction assembly in the steering yoke such that the universal coupling only rotates through an approximate 90° phase.

A further object is to particularly orient the universal coupling and lever arm such that the minimum amounts of fluctuations of mechanical advantage realized are countered by their particular disposition.

A further object of the present invention is to provide an orbital reduction gear arrangement within the steering yoke such that the number of transfer elements of the steering system is reduced to minimize backlash and play within the steering system.

Other objects and advantages of the present invention will become apparent and obvious from a study of the following description and the accompanying drawings which are merely illustrative of the present invention.

In the following description right-hand and left-hand reference is determined by standing to the rear of the steerable vehicle and facing the direction of travel.

DESCRIPTION OF PREFERRED EMBODIMENT

Figure 1:
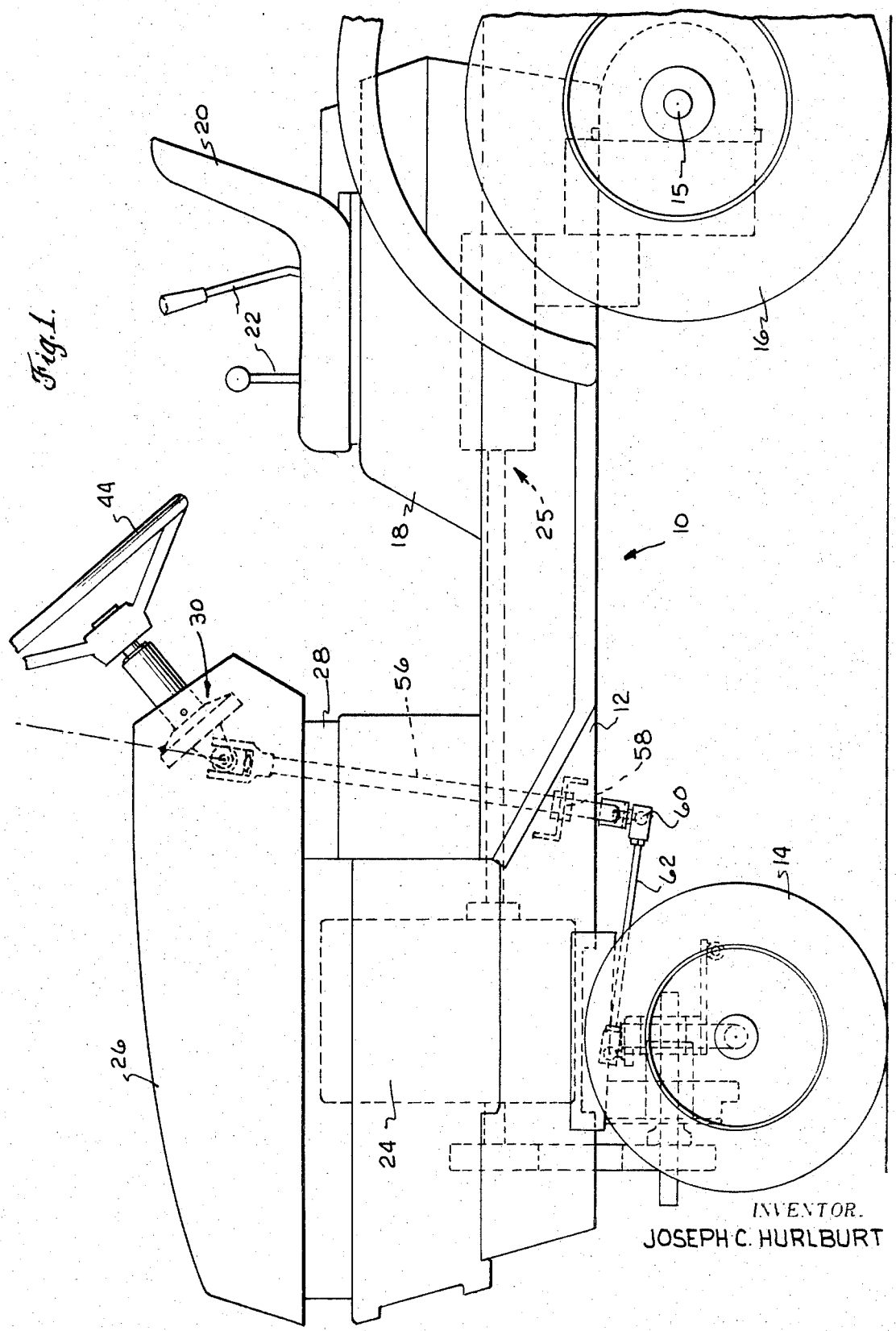
FIG. 1 is a diagrammatic side elevation view of a garden tractor equipped with a steering mechanism constructed in accordance with the present invention.
Figure 2:
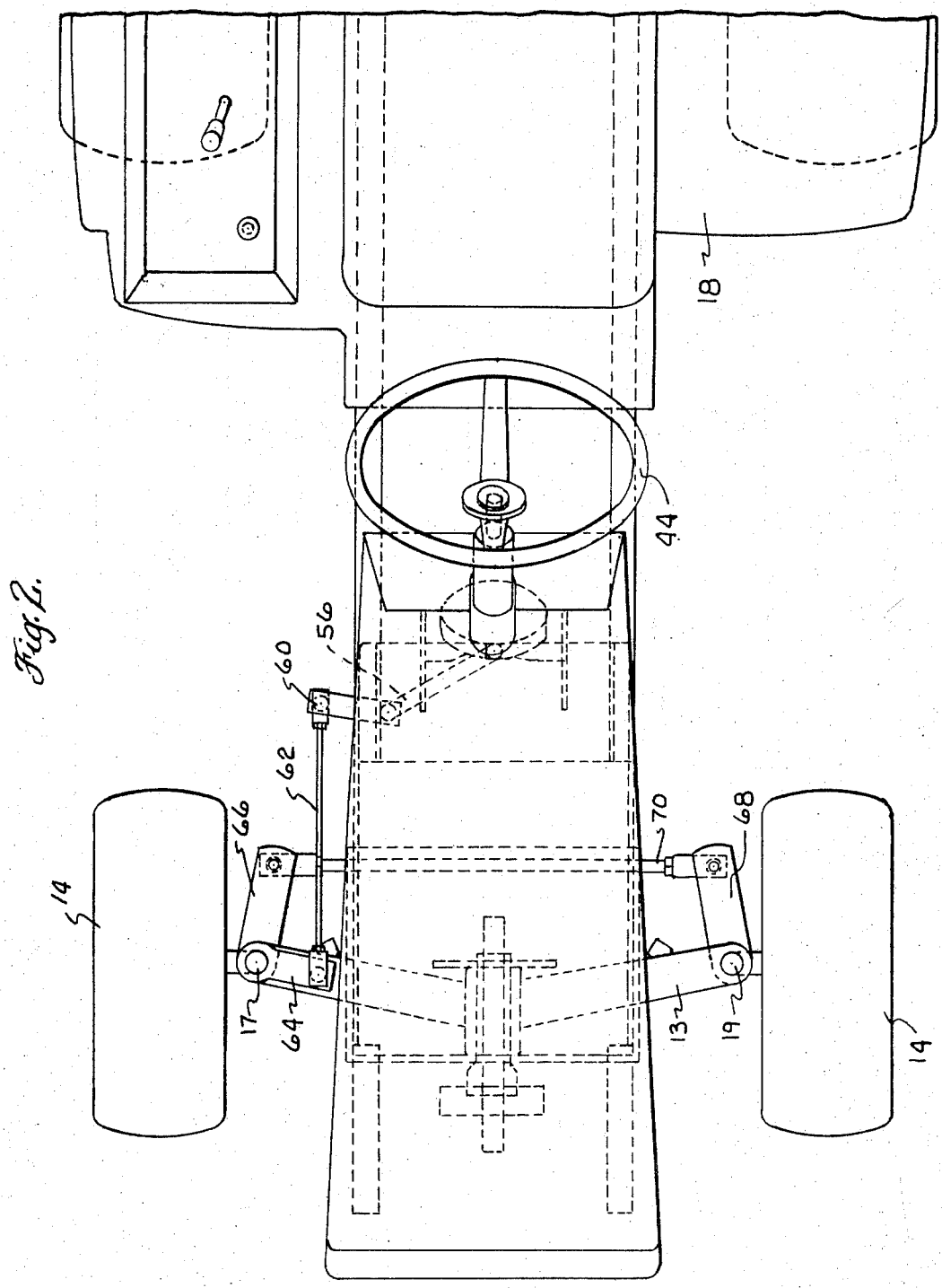
FIG. 2 is a diagrammatic plan view of FIG. 1.

With particular reference to the drawings, particularly FIGS. 1 and 2, the steering system of the present invention is shown embodied within a lawn and garden tractor indicated generally by the numeral 10. Those skilled in the art will appreciate the adaptability of the present invention within other types of steerable vehicles. Generally, the lawn and garden tractor 10 is comprised of a chassis structure 12 having front and rear transversely extending axles 13,15 respectively. Rotatively disposed on opposite ends of front axle 13 are a pair of spindles 17 and 19, the spindles extending in a generally vertical posture and having a pair of front wheels, each indicated by numeral 14, rotatively mounted on the lower outer ends thereof. The rear axle likewise includes a pair of wheels 16 rotatively mounted at opposite ends thereof.

Disposed about the back of chassis 12 is a rear pivotal deck 18 which has a seat 20 fixed thereto. Extending upwardly through a right-hand console portion of the rear deck 18 is a pair of control levers, each being denoted by the numeral 22. Mounted on the front portion of the chassis 12 is a power source 24 indicated by dotted lines only, the power plant being operative to drive a transmission and drive assembly 25 also shown in dotted lines of FIG. 1. Overlying the power source 24 is a hood 26 which extends in a fore-and-aft direction about the forward portion of the tractor 10. Extending downwardly from the hood towards the chassis 12 is a pair of laterally spaced dash supports 28 which as will hereafter be described supports a major portion of the steering assembly that comprises the present invention.

Figure 4:
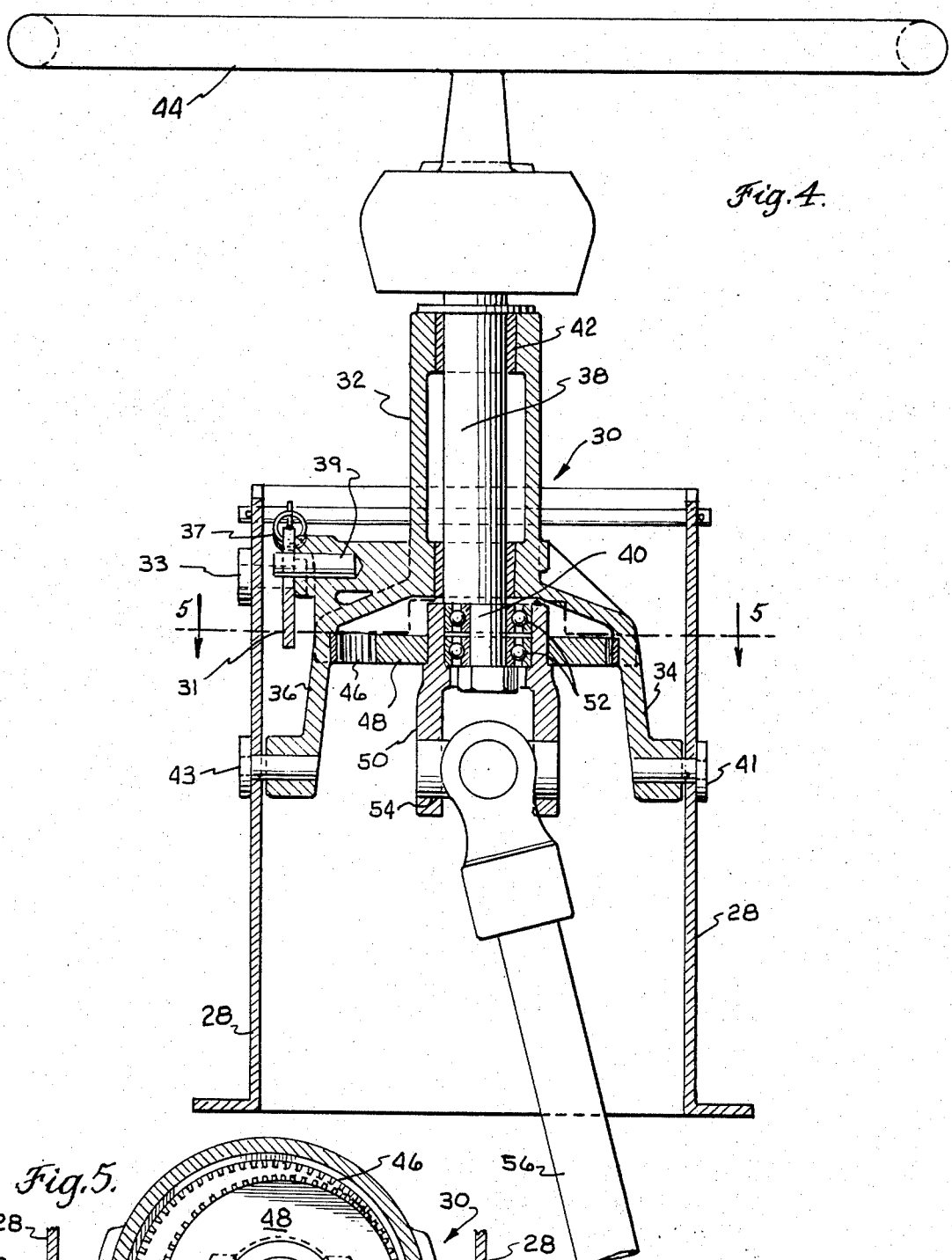
FIG. 4 is a section taken through the line 4—4 of FIG. 3, it being noted that the steering wheel is shown in the upright position by dot and dash lines in FIG. 3.
Figure 5:
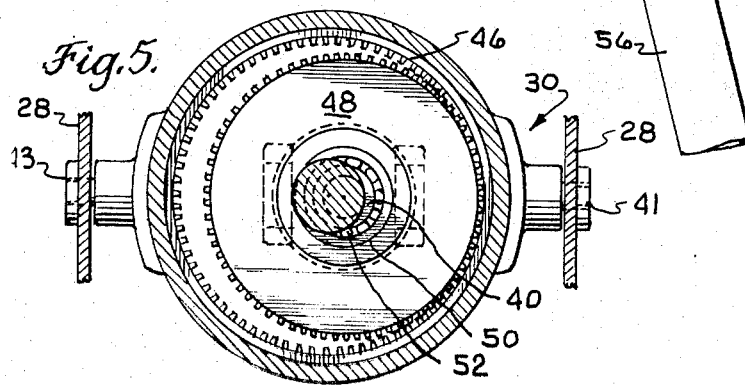
FIG. 5 is a plan section on the line 5—5 of FIG. 4.

Now turning to FIGS. 4 and 5, the steering system of the present invention is shown and generally includes a steering yoke 30 having a collar portion 32 and a pair of laterally spaced legs 34 and 36 depending therefrom. Legs 34 and 36 are pivotally secured to the lateral spaced dash supports 28 by pivot pins 41,43. Journalled within the steering yoke 30 is a steering shaft which includes a primary portion 38 rotatively journalled within the collar portion 32 and an eccentric portion fixed to the lower end of the primary shaft and extending through the plane of an internal ring gear 46. Ring gear 46 is fixed between legs 34,36 and adjacent collar portion 32 by set screws or other suitable means. A steering wheel 42 for turning the steering shaft is fixed to the upper end thereof.

A pinion gear 48 of smaller diameter than the internal ring gear is journalled around the eccentric portion 40 of the steering shaft by a pair of ball bearings 52. The teeth of the pinion gear 48 are aligned with the teeth of the internal ring gear 46 and so disposed such that the pitch diameters of the two gears 46,48 are in tangent relationship.

Forming a part of the pinion gear 48 and extending generally downwardly therefrom is a connecting yoke 50 which is connected to lever arm 56 by universal coupling 54. To facilitate the tilting of the steering shaft, the pivot axis of steering yoke 30 extends generally through the center of the universal coupling's orbit.

To accommodate the vertical oscillation that persists in lever arm 56 due to the orbiting of universal coupling 54, the lever arm is journalled within a spherical bearing 58 which is secured to a lower right-hand side of chassis 12. Fixed to the lower portion of lever arm 56 is a ball joint assembly indicated by numeral 60 which is in turn confined within the rear end of a drag link 62. With reference to FIG. 2, drag link 62 extends in a general fore-and-aft direction with the front end thereof pivotally connected to steering arm 64 which is affixed to the upper portion of the right-hand spindle 17. A radius arm 66 is fixed about a lower portion of the right-hand spindle 17 and has a tie rod 70 connected at its rear end. Tie rod 70 extends transversely beneath chassis 12 and connects with the rear end of a corresponding radius arm 68 whose front portion is fixed to left-hand spindle 19. Thus the articulation translated to the right-hand spindle by steering arm 64 is conveyed by the radius arms 66,68 and tie rod 70 to the left-hand spindle 19.

Figure 3:
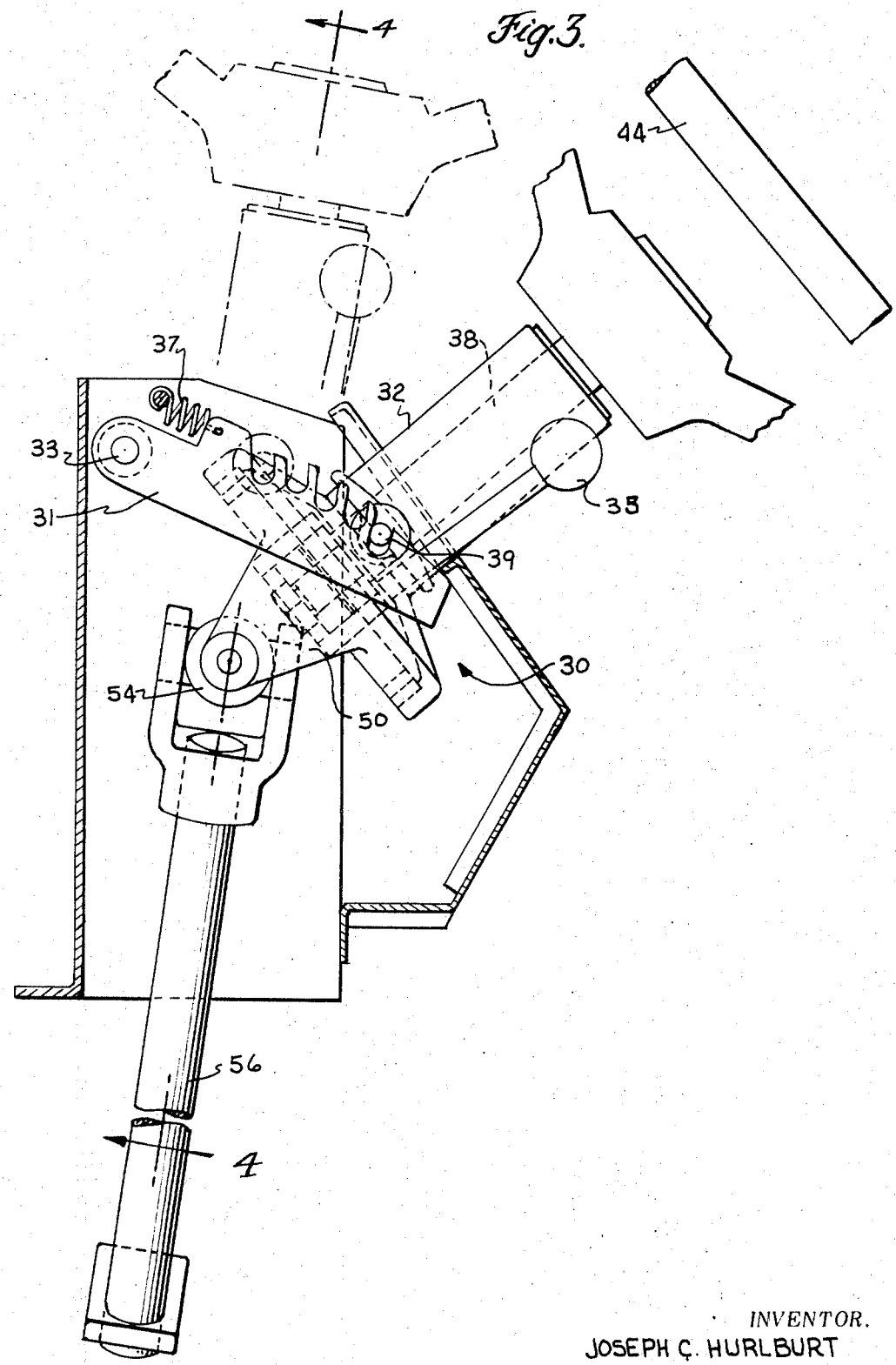
FIG. 3 is an enlarged fragmentary view of the steering mechanism.

Extending vertically alongside steering yoke 30 is a serrated latch 31 pivotally connected to the left side dash support 28 by pivot pin 33 and having a handle portion 35 fixed to its lower end and extending therefrom through the dash. The latch 31 is spring biased to a general upward position by spring 37. As seen in FIG. 3, the serrated latch 31 includes a series of 5 spaced notches for receiving a locking stud 39 which extends laterally from the steering yoke and is adapted for selective insertion into either of the serrated notches.

In the operation of the present tiltable steering system, the pinion gear 48 is caused to orbit about the primary axes of shaft 38 as the steering wheel 42 is rotative. Since the pinion gear 48 is meshed with the internal teeth of ring gear 46 it rotates in a direction opposite that of the primary shaft 38. In the particular embodiment shown, the internal gear has 48 teeth and the pinion gear has 44 teeth; thus yielding a reduction of 11 to 1. This reduction limits the rotation of universal coupling 54 such that a turn covering the entire steering range results in the limited rotation of the coupling of approximately 90°. Thus multiple phases of fluctuations in mechanical advantage of the steering system is avoided. Also the lever arm 56 and universal coupling 54 and the other associated steering linkage is disposed so as to counter the minimum amounts of mechanical advantage fluctuations that are realized in the present steering system.

As best seen in FIG. 3, the steering yoke 30 is tiltable from a general upright position indicated by dotted lines to a lower position shown in solid lines. The latch 31 having five spaced notches covering a range of approximately 40° permits the operator to choose a particular setting for maximum comfort and control. To move the steering column 30 from one position to another, the handle 35 is pressed downwardly causing the locking stud 39 to be disengaged from the latch and allowing the steering yoke to be moved therefrom to another position where it can be secured by releasing the handle 35 of the latch and allowing it to be biased upwardly into engagement with the same locking stud.

The terms, "upper," "lower," "forward," "rearward" etc., have been used herein merely for the convenience of the foregoing specification and in the appended claims to describe the tiltable steering system and its parts as oriented in the drawings. It is to be understood, however, that these terms are in no way limiting to the invention since the steering system may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

Having thus described my invention, what I claim is:

1. A universal type tiltable steering system for a vehicle having front steering wheels, comprising in combination: a frame structure disposed above said vehicle for supporting said steering system; a steering yoke pivotally secured transversely of said support structure and selectively moveable thereabouts between a first upright position and a second lowered position; a latching mechanism having a plurality of spaced settings disposed adjacent said steering yoke, said steering yoke including a locking pin adapted to be received into any of said settings of said latching mechanism, whereby said steering yoke may be selectively anchored in any of the plurality of settings of the latching mechanism; a steering shaft rotatively journalled within said steering yoke and pivotable therewith between said first and second position; a steering wheel fixed to one end of said steering shaft; reduction means having an input portion and an output portion, said input portion being operatively connected to the other end of said steering shaft; a universal coupling fixed to the output portion of said reduction means; and a lever arm and linkage means operatively connected between said universal coupling and said front steerable wheels for transmitting the steering motion thereto, whereby said reduction means functions to reduce the steering motion before it is transmitted through the universal coupling, thereby minimizing the fluctuations in the mechanical advantage resulting from the rotation of said universal coupling.

2. The tiltable steering system as recited in claim 1 wherein said universal coupling and lever arm are particularly orientated to counter those minimum fluctuations in mechanical advantage that are realized by the limited rotation of said coupling.

3. The steering system as set forth in claim 1 wherein said steering reduction means comprises an internal ring gear fixed to said steering yoke and a pinion gear eccentrically journalled around said steering shaft and fixed to said universal coupling, said pinion gear having less teeth than said internal ring gear and adapted to partially mesh with said internal ring gear and orbit thereabout, thereby effectuating a reduction in steering before the steering motion is transmitted through said universal coupling.

4. A tiltable steering system for a vehicle having a wheel supported chassis including front steerable wheels, comprising in combination: mounting structure disposed above said chassis for supporting said steering system; a steering yoke pivotally secured to said mounting structure for tilting movement about a transverse axis, said yoke having a collar portion; an internal ring gear fixed within said steering yoke in axial alignment with said collar portion; a steering shaft having a primary portion journalled for rotation within said collar portion and an eccentric portion extending from said primary portion through the plane of said internal ring gear; a pinion gear and connecting yoke journalled around said eccentric portion with said pinion gear being partially meshed with said internal gear; a universal coupling operatively connected to said connecting yoke; and link means interconnecting said universal coupling with said steerable front wheels, whereby said pinion gear rotates as it orbits within said internal gear, driving said link means which steer said front wheels.

5. A tiltable steering system as recited in claim 4 wherein a latching mechanism having a plurality of spaced sittings is disposed adjacent said steering yoke and wherein said steering yoke includes a locking stud adapted to be received into any of said spaced settings of said latching mechanism, whereby said steering yoke may be selectively anchored in any of the plurality spaced settings of the latching mechanism.

6. The tiltable steering system as recited in claim 4 wherein said universal coupling and lever arm are particularly orientated to counter those minimum fluctuations in mechanical advantage that are realized by the limited rotation of said coupling.

7. A tiltable steering system, comprising in combination: a frame structure for supporting said steering system; a yoke member pivotally secured within said support structure and selectively moveable thereabouts between multiple positions; an input shaft rotatably journalled within said yoke member and pivotal therewith between said multiple positions; a latching mechanism having a plurality of settings disposed adjacent said yoke member for locking the same during the pivoting thereof through said multiple positions; a steering wheel fixed to one end of said steering shaft for rotating the same; universal coupling means operatively connected to the other end of said input shaft; an output shaft fixed to said universal coupling means for transmitting the motion supplied by said drive means to said input shaft; a reduction means operatively associated with said input shaft and said yoke member for reducing the input motion before it is transmitted through said universal coupling means, thereby minimizing the rotation of said coupling means and avoiding multiple phases of fluctuation in mechanical advantage of the steering system.

* * * * *